June 25, 1929.    S. S. MATTHES    1,718,751
CONDUCTOR SUPPORT
Filed Jan. 17, 1928

Witness:
H. J. Stromberger

Inventor
SAMUEL S. MATTHES
By
Attorney

Patented June 25, 1929.

1,718,751

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed January 17, 1928. Serial No. 247,345.

My invention relates to supports for span wires, conductors, etc., and particularly for use in attaching such spans and wires to a support.

The object of my invention is to provide a device which is simple, efficient, inexpensive to manufacture, and which can be installed with a minimum amount of labor.

My invention resides in the new and novel construction, combination and relation of the various elements hereinafter described and shown in the drawing accompanying this specification.

In the preferred embodiment of my invention, I employ a body 1 provided at one end with an eye 2 by means of which the body 1 is attached to a support.

Figure 2:
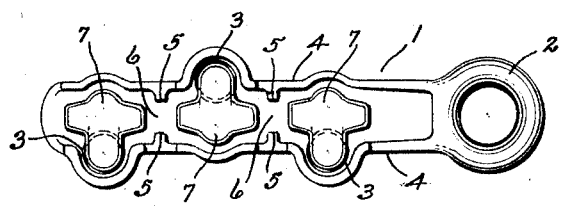
Fig. 2 is a top view of Fig. 1.
Figure 4:
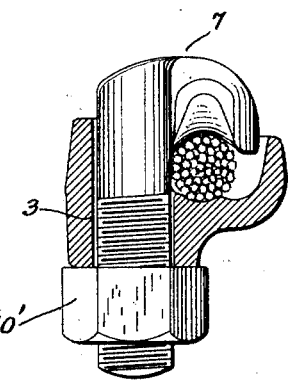
Fig. 4 is a sectional view on the line 4—4 of Fig. 1.

The body proper 1 is provided with a plurality of transverse openings 3 and positioned in staggered relation to each other as shown in Fig. 2. By placing the openings 3 in alternate relation to each other on opposite sides of the body 1, I am able to economize in the length of the body proper 1 which means a decided decrease in the cost of the device.

Figure 3:
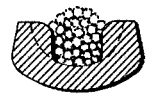
Fig. 3 is a sectional view on the line 3—3 of Fig. 1.

The body proper 1 is provided along the opposite sides with an up-standing rib 4 and projecting inwardly and spaced from each other, are lugs 5 which form between the oppositely disposed lugs, space 6 to receive the span wire or conductor as shown in dotted line in Fig. 3.

Positioned in the transverse openings 3 are hoop-shaped T bolts 7. This bolt comprises a shank portion 8 having threads 9 thereon at one end to receive the threaded nut 10'.

At the opposite end of the shank 8 and positioned on the side, and formed integrally therewith is a head portion 10 having a groove 11 with a convex surface. The head 11 projects preferably an equal distance on each side of the shank 8 in order to bring the strain as nearly symmetrical with respect to the axis of the shank 8 as possible.

Figure 1:
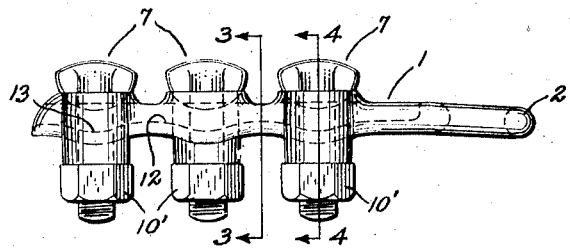
Fig. 1 is a side view of my invention.

It will be noted in Fig. 1 that the surface of the body member 1 throughout the longitudinal length is of a wave or corrugated formation in which there are raised portions 12 between the clamping members 7 and depressed portions 13 immediately below the groove 11.

It will be readily understood that with a cable placed in the longitudinal groove 16 of the body member 1 when the clamping members 7 are drawn into clamping relation with respect to the cable, that the cable will be forced into the depression 13, and this will add materially to the holding or gripping effect of the device.

The positioning of the transverse holes alternately with respect to each other, and on opposite sides of the body member 1. allows the heads 10 or the clamping members to be positioned closer together and at the same time it gives ample room for the application of and the manipulation of the clamping nuts 10'.

If the shanks 8 of the clamping members were all on one side of the body member 1 it would be necessary to lengthen out the clamping portions of the body 1 and I find that this gives a more yielding construction and one which does not hold the cable with as great a degree of safety as where the clamping members are positioned very close together.

The particular form of clamping member 7 which I employ is superior to the ordinary J or hook bolt as I am able with the construction I show to secure a greater area of contact between the clamping member and the cable. With the ordinary J hook bolt, the same is nothing more than a straight piece of round rod, which is turned at one end to form a hook, and threaded at the opposite end; and this it will be recognized gives a very limited area of contact as compared with the T headed J bolt which I employ.

Figure 6:
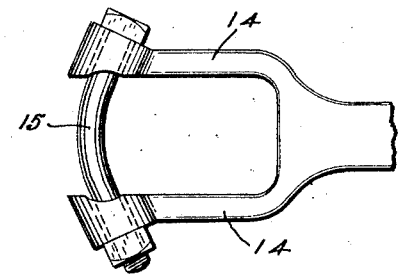
Fig. 6 is a modified form of end, and may be used as a substitute for the end of the device shown in Fig. 1, and is adapted to receive an insulating element, by means of which the device may be secured to a support in insulated relation thereto.

In the modified end shown in Fig. 6, it is the intention to employ an insulator positioned between the arms 14 and held in place by means of a bolt 15.

Clamping members have also been produced with a T head but these are generally formed with a transverse hole through the shank which is underneath the head and this makes it necessary to string the cable through the transverse hole in the shank and if there is a tendency for the wires forming the span cable to separate at the end, then it is a difficult matter to insert the span into and through the transverse hole.

Figure 5:
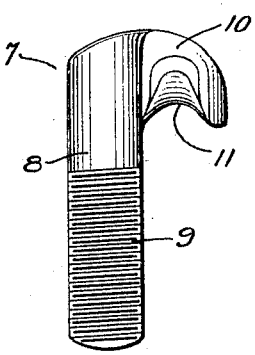
Fig. 5 is a side view of one of the clamping elements.

Employing the form of T headed J bolt shown in Fig. 5 it will be noted that with the nut 10' loosened up, the head portion 10 can be turned from its normal position shown in Fig. 2 so as to leave the longitudinal slot for the cable or span free, thereby permitting the span to be positioned in the longitudinal groove and then the clamping member is rotated back to normal and the nuts 10' drawn up until the cable is properly seated.

The construction described above, and shown in the drawing provides a more economical support, one which is very easy of application and which is efficient.

Modifications will suggest themselves to those schooled in the art, but I wish to be limited only by my claims.

I claim:

1. A cable clamp comprising a body member, means to secure the body to a support, a longitudinally disposed channel on one face of the body, a plurality of transversely disposed holes through the body spaced apart and alternately disposed on opposite sides of the channel, a T-headed hook bolt having a shank rotatably positioned in each hole with the heads longitudinally aligned and above the longitudinal center of the channel, and means on each bolt to draw the head into engagement with a cable positioned in the channel, the rotation of the bolts permitting free access to the channel in positioning the cable.

2. A cable clamp comprising a body member, means to secure the body to a support, a longitudinally disposed channel on one face of the body, a plurality of transversely disposed holes through the body spaced apart and alternately disposed on opposite sides of the channel, a T headed hook bolt having a shank rotatably positioned in each hole with the heads longitudinally aligned, and above the longitudinal center of the channel the head of the bolt being integrally formed thereon, and to one side of the shank, and means on each bolt to draw the head into engagement with a cable positioned in the channel, the rotation of the bolts permitting free access to the channel in positioning the cable.

3. A cable clamp comprising a body member, means to secure the body to a support, a longitudinally disposed channel on one face of the body, a plurality of transversely disposed holes through the body, spaced apart and alternately disposed on opposite sides of the channel, a T headed hook bolt having a shank rotatably positioned in each hole with the heads longitudinally aligned and above the longitudinal center of the channel, the head of the bolt being integrally formed thereon and to one side of the shank and having a convex contracting face, and means on each bolt to draw the head into engagement with a cable positioned in the channel, the rotation of the bolts permitting free access to the channel in positioning the cable.

4. A cable clamp comprising a body member, means to secure the body to a support, a longitudinally disposed groove on one face of the body and having alternately raised and depressed portions in alinement, a plurality of spaced clamping members each having a T-shaped head in alinement and positioned above the depressed portions of the groove, a shank integrally formed with each head to one side thereof, passages through the body to the side of the groove and alternately spaced on opposite sides of the groove and opposite the depressed portion of the groove to receive the shank in rotatable relation to the body and means to draw the clamping member towards the body member and into engagement with a cable in said channel.

5. A cable clamp comprising an elongated body member, and means thereon to attach the body to a support, a flange along each edge of the body on face, inwardly projecting spaced lugs from the flanges to define a channel in the said face, transverse openings through the body to the side of the channel, a T-headed hook bolt with an integrally formed shank positioned in each opening with the heads in spaced alinement and the said spaced lugs positioned between the heads and means to draw the heads towards the body.

6. A cable fitting comprising a body member having holding means at one end, a longitudinal groove in one face of the body member, openings through the body spaced apart and alternately disposed on opposite sides of the groove, a holding device in each opening comprising a T-headed J-bolt with each head in alinement with the groove and means on each holding device to draw the head towards the body member to grip a cable therebetween.

7. A cable clamp comprising a body member, spaced arms projecting from the body, means connecting the extreme ends of the spaced arms to support and maintain an insulator between said arms, a longitudinally disposed channel on one face of the body, a plurality of transversely disposed holes through the body spaced apart and alternately disposed on opposite sides of the channel, a T-headed bolt having a shank rotatably positioned in each hole with the heads longitudinally aligned and above the longitudinal center of the channel and means on each bolt to draw the head into engagement with a cable positioned in the channel, the rotation of the bolts permitting free access to the channel in positioning the cable.

8. A cable fitting comprising a body member having holding means, a longitudinal groove in one face of the body member, openings through the body spaced apart and alternately disposed on opposite sides of the groove, a T-headed holding device in each opening comprising a part extending through the opening and a head portion overhanging the groove and means on the said part of each holding device to draw the head towards the body to grip the cable therebetween.

In testimony whereof I affix my signature.

SAMUEL S. MATTHES.